(12) United States Patent
Kuribayashi et al.

(10) Patent No.: US 7,810,872 B1
(45) Date of Patent: Oct. 12, 2010

(54) SUNROOF SUPPORT STRUCTURE FOR A VEHICLE BODY

(75) Inventors: Akihiko Kuribayashi, Dublin, OH (US); Brent Nathaniel Gaertner, Columbus, OH (US); Michael E. Franz, Dublin, OH (US); Yan Beaudoin, Belleville (CA)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/481,228

(22) Filed: Jun. 9, 2009

(51) Int. Cl.
*B62D 25/06* (2006.01)
(52) U.S. Cl. .................... 296/191; 296/29; 296/215
(58) Field of Classification Search ............. 296/215, 296/29, 191
See application file for complete search history.

(56) References Cited

U.S. PATENT DOCUMENTS

| | | | |
|---|---|---|---|
| 3,078,122 A | 2/1963 | Werner | |
| 4,892,351 A | 1/1990 | Ono et al. | |
| 4,989,912 A * | 2/1991 | Furman | 296/201 |
| 5,669,657 A | 9/1997 | Miyazawa | |
| 6,059,356 A | 5/2000 | Hoelzel et al. | |
| 6,481,788 B1 | 11/2002 | Moriyama et al. | |
| 6,513,865 B1 | 2/2003 | Lutz et al. | |
| 7,077,462 B1 | 7/2006 | DeGaillard | |
| 2006/0119142 A1 | 6/2006 | Boehm et al. | |
| 2006/0202518 A1 | 9/2006 | Osterberg et al. | |
| 2007/0085386 A1 | 4/2007 | Zirbs et al. | |

* cited by examiner

*Primary Examiner*—Dennis H Pedder
(74) *Attorney, Agent, or Firm*—Rankin Hill & Clark LLP

(57) ABSTRACT

A roof structure for a vehicle body includes a roof having a roof opening that is closed by a cover member. The roof structure comprises a frame member, a left side panel member and a right side panel member. The frame member is configured to frame the roof opening. The frame member supports the cover member. Each side panel member forms a part of the vehicle body and is adhesively secured to the frame member. A peripheral edge portion of each side panel member includes at least one channel adapted to allow escape of an adhesive disposed between the side panel member and the frame member for ease of assembly of the roof structure to the vehicle body.

15 Claims, 4 Drawing Sheets

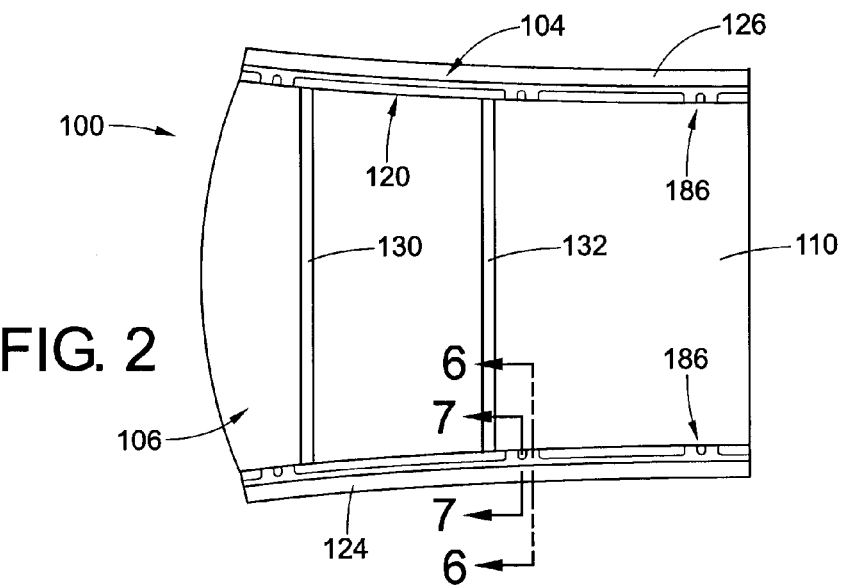
FIG. 2
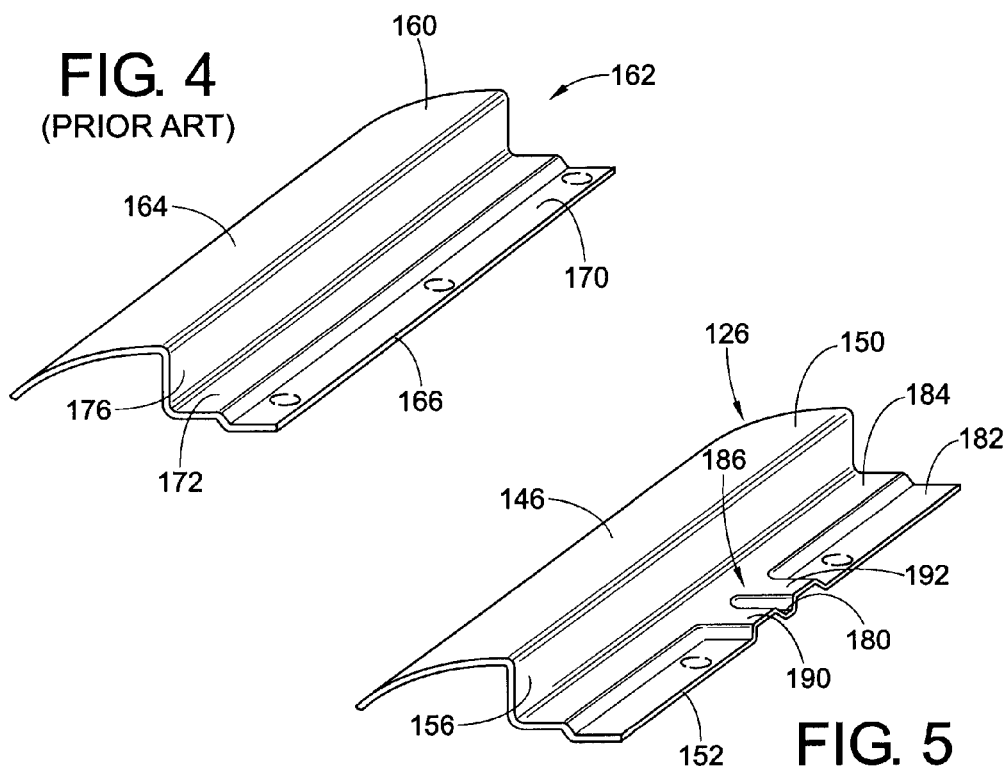
FIG. 4 (PRIOR ART)
FIG. 5

SUNROOF SUPPORT STRUCTURE FOR A VEHICLE BODY

BACKGROUND

Exemplary embodiments herein relate to a vehicle roof structure, and, more particularly, to a side panel outer of a vehicle body including a body control surface for positioning of a sunroof assembly.

One known vehicle roof assembly includes frame members supported by right and left side panel outer members of the vehicle body. In this assembly, the frame members define lateral sides of a sunroof opening and cross members span across the frame members. A sunroof cover (e.g., a framed glass pane) is supported over the sunroof opening by the frame members and the cross members. The side panel outer members each include traditional body-in-white flange surfaces for supporting the frame members, which in turn support the sunroof cover. Vertical spacers are sometimes interposed between the flange surfaces and the frame members at a plurality of vertical positioning locations disposed longitudinally along the flange surfaces.

When an adhesive (e.g., a urethane adhesive) is used in the connection with the roof assembly described above, it is possible for the adhesive to undesirably lodge itself between the vertical spacers and the flange surfaces. This can adversely impact the final position of the roof assembly relative to the surrounding vehicle body. For example, the sunroof cover may not fit flush relative to the surrounding roof structure. In addition, the flange surfaces have no control surfaces (i.e., datum surfaces) for fitting of parts. This can also result in an undesirable fit condition.

BRIEF DESCRIPTION

According to one aspect, a roof structure for a vehicle body is provided. The vehicle body includes a roof having a roof opening that is closed by a cover member. The roof structure comprises a frame member, a left side panel member and a right side panel member. The frame member is configured to frame the roof opening. The frame member supports the cover member. Each side panel member forms a part of the vehicle body and is adhesively secured to the frame member. A peripheral edge portion of each side panel member includes at least one channel adapted to allow escape of an adhesive disposed between the side panel member and the frame member for ease of assembly of the roof structure to the vehicle body.

According to another aspect, a sunroof assembly for a vehicle body is provided. The vehicle body includes a roof having a roof opening. The sunroof assembly comprises a frame member which defines the roof opening. A transparent member covers the roof opening. The transparent member is bonded to the frame member. A vehicle body side panel member has a peripheral edge portion bonded to the frame member. A section of the peripheral edge portion has a generally corrugated profile for allowing extra bonding agent disposed between the peripheral edge portion of the side panel member and the frame member to flow out of the sunroof assembly. This allows for ease of assembly of the sunroof assembly to the vehicle body by preventing the frame member from sitting too high on the side panel member.

According to yet another aspect, a sunroof assembly for a vehicle body is provided. The vehicle body includes a roof having a roof opening. The sunroof assembly comprises a frame member configured to frame the roof opening. A transparent member covers the roof opening. The transparent member is bonded to the frame member. A vehicle body side panel member has a peripheral edge portion bonded to the frame member. The peripheral edge portion has a stepped configuration and includes a first surface and a second surface. The second surface intersects the first surface at least two spaced apart locations. The intersection of the first and second surfaces defines a path for extra bonding agent to pass through the side panel member without affecting a final fitting condition between the side panel member and the frame member.

BRIEF DESCRIPTION OF THE DRAWINGS

FIG. 2 is an enlarged top plan view of the roof support structure of FIG. 1 shown with cross braces for supporting the sun roof.

FIG. 4 is an enlarged partial perspective view of a portion of a known side panel member.

FIG. 5 is an enlarged partial perspective view of a portion of the right side panel member of FIG. 3 taken generally along line 5-5 of FIG. 3 to illustrate a corrugated section.

DETAILED DESCRIPTION

Figure 1:
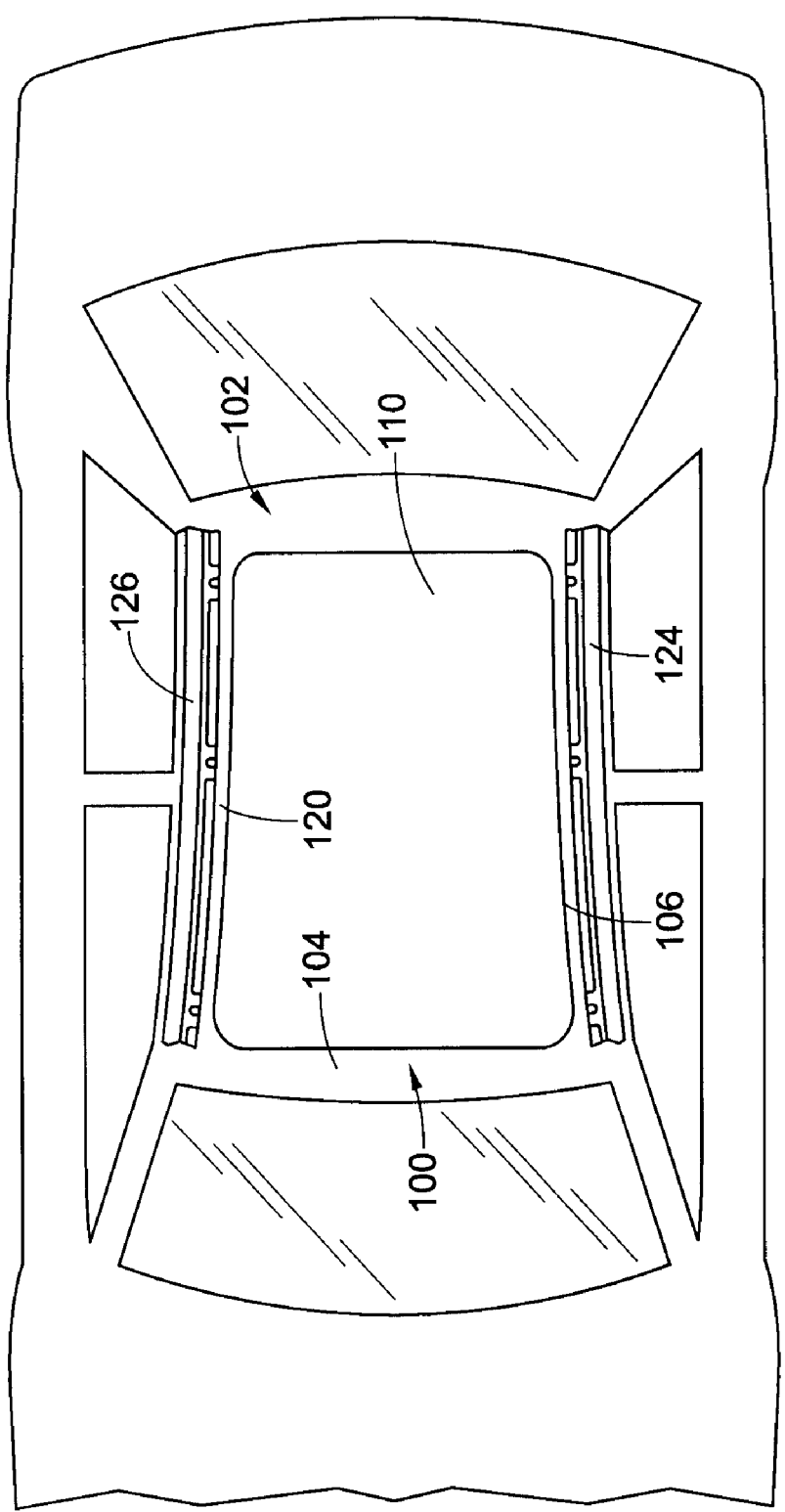
FIG. 1 is a schematic top plan view of a vehicle body including an exemplary embodiment of a roof support structure for a sunroof.

It should, of course, be understood that the description and drawings herein are merely illustrative and that various modifications and changes can be made in the structures disclosed without departing from the present disclosure. It will also be appreciated that the various identified components of the roof structure disclosed herein are merely terms of art that may vary from one vehicle manufacturer to another and should not be deemed to limit the present disclosure. All references to direction and position, unless otherwise indicated, refer to the orientation of the roof structure illustrated in the drawings and should not be construed as limiting the claims appended hereto. Like numerals refer to like parts throughout the several views.

Referring now to the drawings wherein the showings are for purposes of illustrating one or more embodiments only and not for purposes of limiting the same, FIGS. 1 and 2 illustrate an exemplary embodiment of a roof support structure 100 for a vehicle body 102. The vehicle body 102 includes a roof 104 having a roof opening 106 that is closed by a cover member 110. In the depicted embodiment, the roof structure 100 is a sunroof assembly and the cover member 110 is a transparent member which is adhesively secured to a frame member 120. The frame member 120 is configured to frame the roof opening 106. The frame member 120 is adhesively secured to left and right side panel members 124 and 126, respectively, each side panel member forming a part of the vehicle body 102. As shown in FIG. 2, the roof support structure 100 can further include roof rail braces 130 and 132 which span between the left and right side panel members 124 and 126. Opposed ends of each roof rail braces 130 and 132 are fixedly secured to the side panel members 124, 126. The vehicle body 102 can be a unibody construction, but can alternatively be constructed using any of a variety of other conventional construction techniques.

Figure 3:
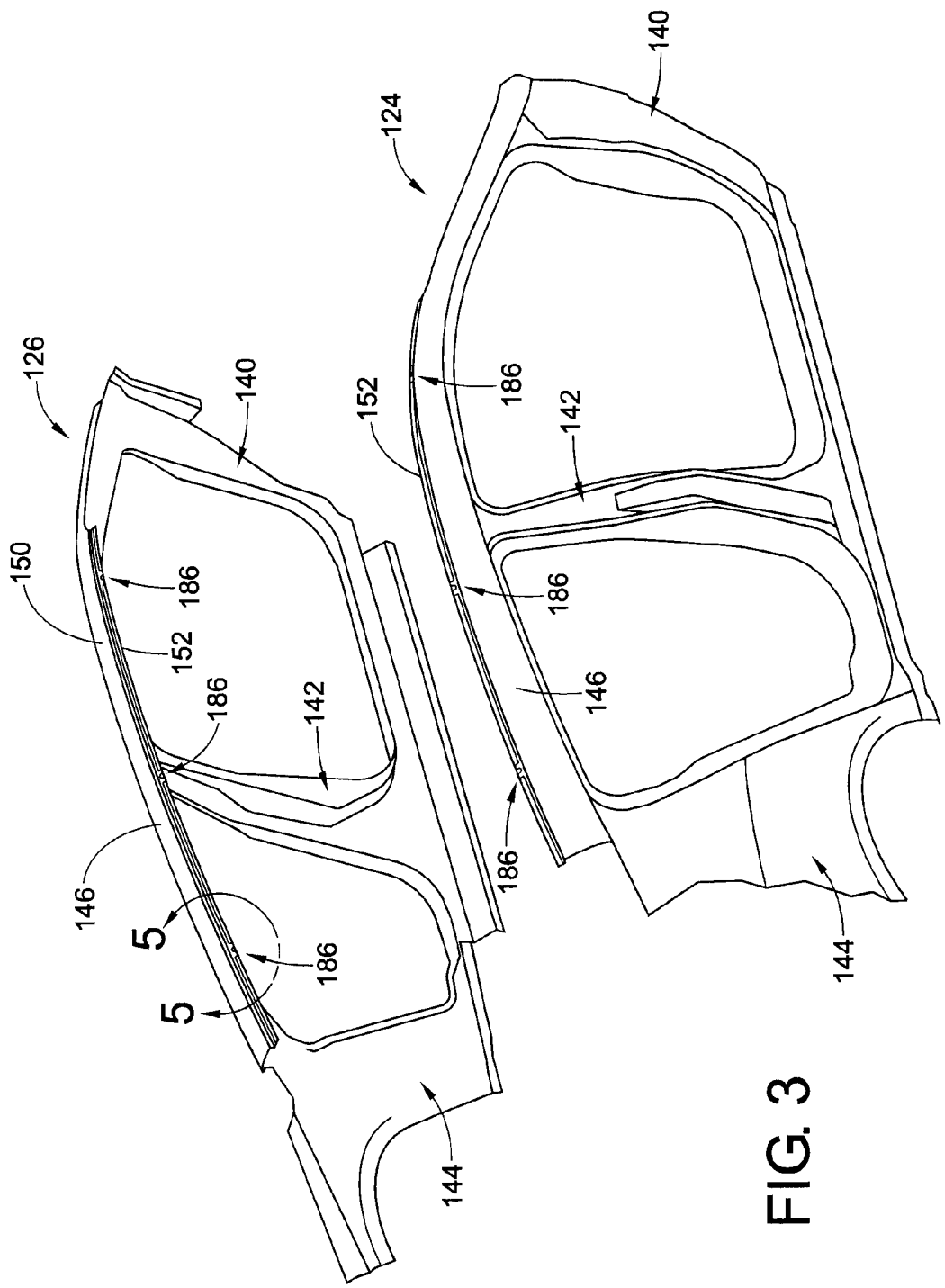
FIG. 3 is a perspective view of left and right side panel members of the vehicle body, the side panel members including top side roof rails for the roof support structure of FIG. 1.

With reference to FIG. 3, the left and right side panel members 124 and 126 can be mirror images of each other with respect to a centerline of the vehicle body 102. Each side panel member 124 and 126 includes an A-pillar region 140, a B-pillar region 142 and a C-pillar region 144. A top side roof rail 146 spans generally between the A-pillar region 140 and the C-pillar region 144. The top side roof rail 146 includes a top wall 150 having a peripheral edge portion 152. A generally vertical wall 156 separates the top wall 150 from the peripheral edge portion 152. As will be discussed in greater detail below, the peripheral edge portion 152 has a stepped configuration such that the peripheral edge portion is bonded to a specific portion of the frame member 120 and is fixedly attached to a specific portion of the vehicle body 102 by conventional welding techniques, such as spot welding.

With reference to FIG. 4, a portion of a top side roof rail 160 of a known side panel member 162 is illustrated. The top side roof rail 160 includes a top wall 164 and a peripheral edge portion 166. The peripheral edge portion has a stepped configuration, including a first surface 170 and a second surface 172 which is elevated relative to the first surface. A generally vertical wall 176 separates the top wall 164 from the second surface 172. The first surface 170 is used as a welding flange for fixedly securing the side panel member 162 to the vehicle body. The first surface 170 is also adhesively attached (e.g., by a urethane adhesive) to a frame member of a roof support structure, such as frame member 120. At least one spacer member (not shown) is securely positioned between the frame member and the second surface 172 of the top side roof rail 160 at vertical positioning control locations. With this known top side roof rail 160, a bonding agent, such as urethane adhesive, which is used to bond the first surface 170 to the frame member, can inadvertently flow between the spacer member and the top side roof rail 160. This can impact a final position of the roof support structure relative to the surrounding vehicle body, which can result in an undesirable fit condition.

With reference to FIG. 5, the exemplary peripheral edge portion 152 of the top side roof rail 146 of each side panel member 124 and 126 includes at least one channel 180 which defines a path adapted to allow escape of a bonding agent/adhesive that is disposed between the side panel member 124 or 126 and the frame member 120. In the depicted embodiment, the peripheral edge portion 152 includes a first surface 182 and a second surface 184 which is offset from the first surface 182. As shown, the second surface 184 is spaced inwardly from and is elevated relative to the first surface 182. The first and second surfaces 182 and 184 together define the channel 180.

Particularly, a section 186 of the peripheral edge portion 152 has a generally corrugated profile for allowing extra bonding agent disposed between the peripheral edge portion 152 of each side panel member 124, 126 and the frame member 120 to flow out of the sunroof assembly 100 which allows for ease of assembly of the sunroof assembly 100 to the vehicle body 102 by preventing the frame member 120 from sitting too high on the side panel members 124, 126. To form the generally corrugated section 186, the second surface 184 intersects the first surface 182 at least two spaced apart locations. The intersection of the first and second surfaces 182 and 184 defines the channel or path 180 for extra bonding agent to pass between the side panel member 124, 126 and the frame member 120. As shown, the second surface 184 includes at least one pair of spaced apart control surfaces 190 and 192.

Each control surface 190 and 192 of the second surface 184 intersects the first surface 182. Because the first and second control surfaces 190, 192 are elevated relative to the first surface 182, the intersection of the pair of control surfaces 190, 192 and the first surface 182 defines the channel 180. As shown in FIG. 3, each side panel member 124 and 126 of the illustrated embodiment includes three spaced apart generally corrugated sections 186, each section 186 including a channel 180 for the flow of extra adhesive disposed between the peripheral edge portion 152 of each side panel member 124, 126 and the frame member 120.

Figure 6:
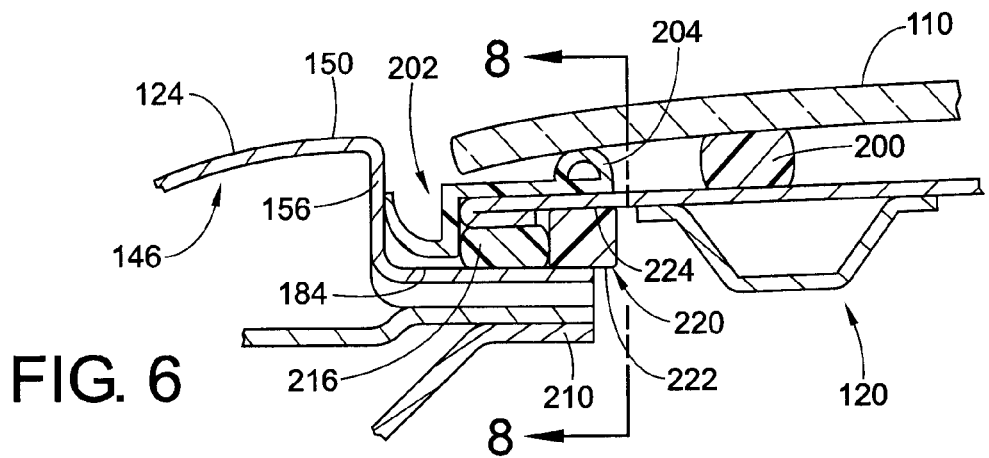
FIG. 6 is a cross-sectional view of the roof support structure taken generally along line 6-6 of FIG. 2.
Figure 7:
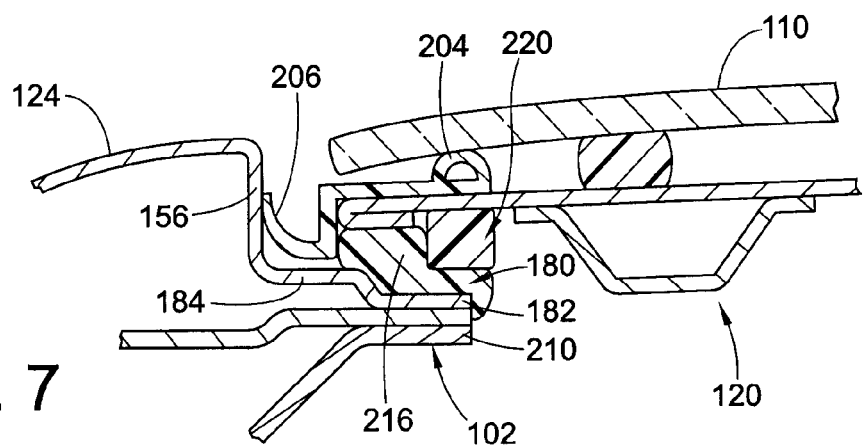
FIG. 7 is a cross-sectional view of the roof support structure taken generally along line 7-7 of FIG. 2.
Figure 8:
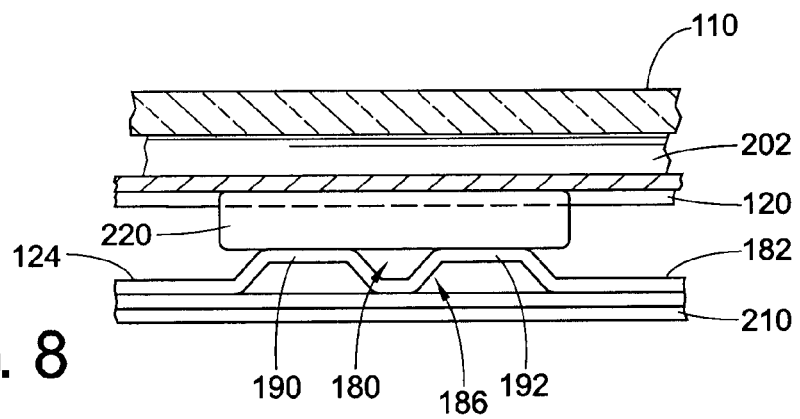
FIG. 8 is a cross-sectional view of the roof support structure taken generally along line 8-8 of FIG. 6.

FIGS. 6-8 illustrate the roof structure 100 in an assembled condition. The cover member or transparent member 110 is adhesively secured to the frame member 120 via a bonding agent or adhesive 200. A seal member 202 covers a gap between the top side roof rail 146 and the frame member 120 and covers a gap between the transparent member 110 and the frame member 120. Particularly, the seal member 202 includes a bulbous portion 204 positioned between the transparent member 110 and the frame member 120 and a leg portion 206 positioned between the vertical wall 156 of the top side roof rail 146 and the frame member 120. The first surface 182 is fixedly secured to a portion of the vehicle body 102 such as a vehicle body stiffener 210 positioned at least partially beneath the frame member 120. The second surface 184 of the peripheral edge portion 156 is spaced from the body stiffener 210 and is adhesively secured to the frame member 120 via a bonding agent or adhesive 216. As shown in FIG. 7, the channel 180 defines the path for the bonding agent 216 to pass through the side panel member 124 without affecting a final fitting condition between the side panel member 124 and the frame member 120.

At least one spacer member 220 is securely positioned between the frame member 120 and each side panel member 124 and 126. As shown in FIG. 6, a bottom surface 222 of the spacer member 220 abuts the second surface 184 of the side panel member and a top surface 224 of the spacer member 220 abuts the frame member 120. The channel 180 is configured to prevent the adhesive 216 from flowing between the spacer member 220 and the side panel member 124, 126. Particularly, as shown in FIG. 8, the spacer member 220 traverses or spans across the channel 180 and sits atop the control surfaces 190 and 192. The spacer member 220 is positioned between the frame member 120 and the corrugated section 186 of the peripheral edge portion 156. This arrangement prevents the adhesive 216 from being located between the top side roof rail 146 and the frame member 120.

As is evident from the foregoing, the roof structure or sunroof assembly 100 provides control surfaces 190 and 192 on the side panel members 124 and 126, which provides for a good final fitting condition. Using the peripheral edge portion 156 of each side panel member 124 and 126 as a datum, the number of tolerance contributors are minimized. Further, the sunroof assembly 100 is configured to provide a path 180 for extra urethane adhesive 216 to pass through the side panel members 124 and 126 without affecting the final fitting condition between the side panel members 124, 126 and the frame member 120. The section 186 of the peripheral edge portion 152 having the generally corrugated or bump shape also provides a strong support surface as compared to the conventional flat weld flange 170.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A roof structure for a vehicle body including a roof having a roof opening that is closed by a cover member, the roof structure comprising:
   a frame member configured to frame the roof opening, the frame member supporting the cover member; and
   a left side panel member and a right side panel member, each side panel member forming a part of the vehicle body and being adhesively secured to the frame member, a peripheral edge portion of each side panel member including at least one channel adapted to allow escape of an adhesive disposed between the side panel member and the frame member for ease of assembly of the roof structure to the vehicle body,
   wherein the peripheral edge portion of each side panel member includes a first surface and a second surface which is offset and spaced inwardly from the first surface, the second surface including at least one pair of spaced apart control surfaces, each control surface intersecting the first surface, the at least one pair of control surfaces and the first surface together defining the at least one channel.

2. The roof structure of claim 1, wherein the second surface is elevated relative to the first surface, the first surface being fixedly secured to the vehicle body, the second surface being adhesively secured to the frame member.

3. The roof structure of claim 1, wherein the second surface is spaced inwardly from the first surface.

4. The roof structure of claim 1, wherein the cover member is adhesively secured to the frame member.

5. The roof structure of claim 1, wherein each side panel member includes three spaced apart channels.

6. The roof structure of claim 1, further including at least one spacer member securely positioned between the frame member and each side panel member, the at least one channel configured to prevent the adhesive from flowing between the at least one spacer member and the side panel member.

7. The roof structure of claim 6, wherein the at least one spacer member spans across the at least one channel.

8. The roof structure of claim 1, wherein each side panel member is fixedly secured to a vehicle body stiffener positioned at least partially beneath the frame member.

9. A sunroof assembly for a vehicle body including a roof having a roof opening, the sunroof assembly comprising:
   a frame member defining the roof opening;
   a transparent member for covering the roof opening, the transparent member being bonded to the frame member; and
   a vehicle body side panel member having a peripheral edge portion bonded to the frame member, a section of the peripheral edge portion having a generally corrugated profile for allowing extra bonding agent disposed between the peripheral edge portion of the side panel member and the frame member to flow out of the sunroof assembly allowing for ease of assembly of the sunroof assembly to the vehicle body by preventing the frame member from sitting too high on the side panel member,
   wherein the peripheral edge portion of the side panel member includes a first surface and a second surface which is elevated with respect to the first surface, the second surface including a pair of spaced apart control surfaces, each control surface intersecting the first surface the pair of control surfaces and the first surface together defining the corrugated section.

10. The sunroof assembly of claim 9, wherein the generally corrugated section of the peripheral edge portion defines a channel for the flow of the bonding agent.

11. The sunroof assembly of claim 10, further including a spacer member securely positioned between the frame member and the corrugated section, the spacer member traversing the channel.

12. The sunroof assembly of claim 9, wherein the first surface is welded to the vehicle body and the second surface is bonded to the frame member.

13. A sunroof assembly for a vehicle body including a roof having a roof opening, the sunroof assembly comprising:
   a frame member configured to frame the roof opening;
   a transparent member for covering the roof opening, the transparent member being bonded to the frame member; and
   a vehicle body side panel member having a longitudinal peripheral edge portion bonded to the frame member, the peripheral edge portion having a stepped configuration including a first surface and a second surface, the second surface laterally intersecting the first surface at least two spaced apart locations, the intersection of the first and second surfaces at the two locations defining a laterally extending channel for extra bonding agent to pass through the side panel member without affecting a final fitting condition between the side panel member and the frame member.

14. The sunroof assembly of claim 13, wherein the second surface is elevated with respect to the first surface, the first surface being welded to the vehicle body and the second surface being bonded to the frame member.

15. The sunroof assembly of claim 13, wherein the intersection of the first and second surfaces has a generally corrugated profile.

* * * * *